W. GARDINER.
STORAGE BATTERY.
APPLICATION FILED AUG. 3, 1914.
1,178,066. Patented Apr. 4, 1916.
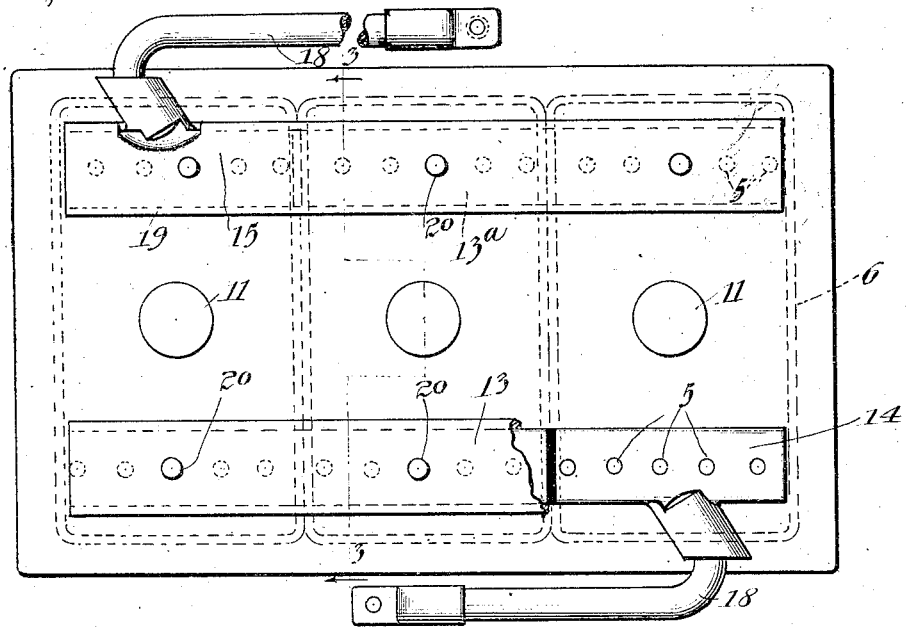
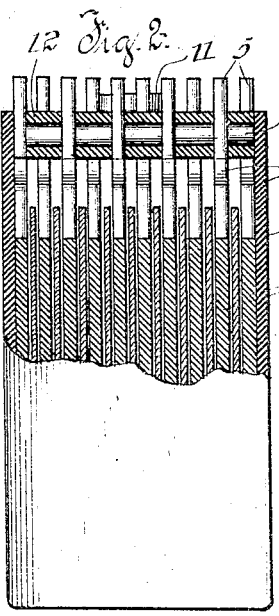
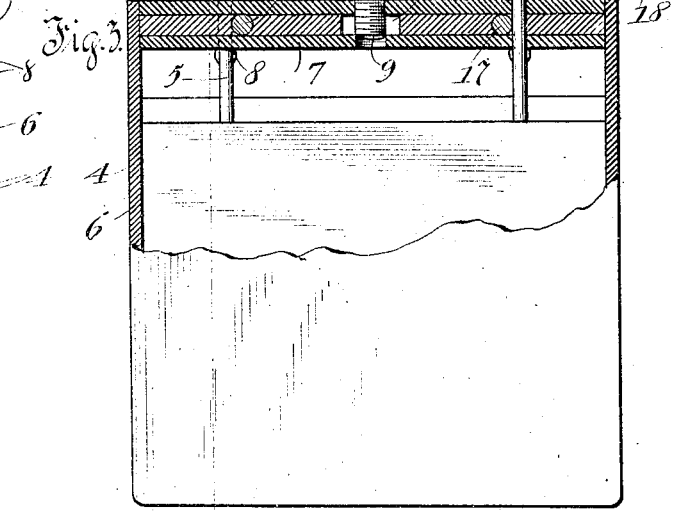

UNITED STATES PATENT OFFICE.

WILLIAM GARDINER, OF CHICAGO, ILLINOIS, ASSIGNOR TO GARDINER STORAGE BATTERY COMPANY, OF CHICAGO, ILLINOIS, A CORPORATION OF ILLINOIS.

STORAGE BATTERY.

1,178,066.  Specification of Letters Patent.  Patented Apr. 4, 1916.

Application filed August 3, 1914. Serial No. 854,612.

*To all whom it may concern:*

Be it known that I, WILLIAM GARDINER, a citizen of the United States of America, and resident of Chicago, Cook county, Illinois, have invented a certain new and useful Improvement in Storage Batteries, of which the following is a specification.

My invention relates to improvements in storage batteries, and has for its object the provision of a simplified battery construction in which all inside connections are avoided and in which the connections are made by means of a bus-bar located on top of the battery. In this manner, all inside connections being avoided, there is no corrosion, and, furthermore, the battery is not resistant to the discharge as the bus-bar will carry any load demanded of it.

By my invention I provide a secondary battery in which each plate is provided with a terminal extending through a double sealed cover and a bus-bar is provided to connect together the upper ends of these terminals, connecting cables being welded to the bus-bars. In this manner all connections are made outside of the battery.

These and other objects of my invention will be more clearly understood by having reference to the accompanying drawings, in which—

Figure 1 is a plan view of three cells embodying the features of my invention. Fig. 2 is a partial sectional view of one of the cells, taken on the line 2—2 of Fig. 3. Fig. 3 is an end view partly in section on the line 3—3 of Fig. 1.

As illustrated, each cell comprises a plurality of plates 4, the plates of one polarity being alternated with plates of the opposite polarity. These plates are separated by any suitable insulating material, in the usual manner. Each of these plates is provided with an upwardly extending rod 5, these rods being connected to one side of the positive plates and to the opposite side of the negative plates, so that there are two series of these rods projecting upwardly through the top of the cell. These plates are grouped together in the vessel or casing 6, made of hard rubber, and the hard rubber cover 7 then inserted in the top of this vessel, which cover is provided with a series of holes for the reception of the upper ends of the rods 5. These rods are provided with shoulders 8 for supporting the cover 7. A central opening 9 is provided within which opening is threaded the plug 10 having a flat circular head 11. Suitable sealing material or wax is then placed over the hard rubber cover 7, and this sealing brought up to a level with the shoulder on the upper end of the plug 10. The second hard rubber cover 12 is then set in place on this sealing, and the edges of this plate again sealed. A number of these cells are then placed adjacent to one another in a suitable receptacle in such a manner that the negative pole of one cell is opposite the positive of the next. In order to prevent the cover 12 from warping, I provide two rods 16 and 17 for each cell which support the cover of the cell. Bus-bars 13—13$^a$ are then secured to the upper ends of the terminals 5 of each of these cells. The bus-bar 13 is provided with a portion 14 suitably insulated from the remaining portion of the bus-bar, while the bus-bar 13$^a$ is likewise provided with an insulated portion 15. The connecting cables 18 are welded to these insulated portions 14—15, and in this manner it will be seen that by means of these two bus-bars the three cells are connected in series, the positive poles of one cell being connected to the negative of the next, and so on.

In order to prevent any possibility of the battery becoming short-circuited by a metal rod or bar accidentally thrown across the connecting bars, I provide each bus-bar with an insulating cap 19. Each cap is provided with one or more openings 20, so that contact can be made with the metal bar by the leads of a voltmeter to test the voltage of each cell. Of course, if desired, but one contact strip would have to be insulated, although I prefer to insulate both.

It will thus be seen that I have devised a very efficient form of secondary battery construction, and one in which all of the connections are made by means of the bus-bars located above the double hard rubber cover, which cover is sealed tight so that there is no possibility of the electrolyte coming in contact with these connections, and thus all corrosion is prevented.

In previous constructions in which the connections between the several plates were made below the cover and then the entire current was carried by a single terminal extending through the cover, difficulty was experienced due to the electrolyte action working upward on this terminal. This action is known as "creeping," and is practically eliminated by my construction as each terminal carries but a small porportion of the entire capacity of the cell. In the battery illustrated, where there are five plates, each terminal carries but one-fifth of the total capacity of the cell, and thus the action on each terminal is reduced to one-fifth of the total; and, furthermore, the double sealed cover prevents this corrosion working upward and in this way the detrimental creeping is substantially eliminated.

While I have illustrated and described one specific embodiment of my invention, it will, of course, be understood that I do not wish to limit myself to the exact construction shown and described, as many modifications and changes will readily suggest themselves to those skilled in the art.

Certain features of my invention are disclosed and claimed in my application Serial Number 766,285, filed May 8th, 1913, for improvement in storage batteries, and as to these features I intend that this application shall be a continuation of my earlier application.

What I claim as my invention is:

1. In a storage battery, a series of electrode plates, each having an upwardly extending rod secured thereto, a containing vessel for said plates, a cover therefor, said rods passing through said cover, said cover comprising a pair of hard rubber plates, separated by sealing material, both of said plates being sealed in said vessel, connections between said rods at points on said cover, and shoulders on said rods supporting the lower plate.

2. In a storage battery, a series of cells, each cell comprising a plurality of electrode plates, each plate having an upwardly extending rod extending therefrom, a containing vessel for each of said cells having a cover sealed within said vessel, said rods extending through said cover, said cover comprising a pair of hard rubber plates separated by sealing material and reinforcing rods between said cover plates extending in a plane at right angles to said terminal rods, and a metallic strip connecting the rods of one polarity of one cell with the rods of the opposite polarity of the succeeding cell.

3. In a storage battery, a series of electrode plates, each having an upwardly extending rod secured thereto, a containing vessel for said plates, a cover therefor, said rods passing through said cover, said cover comprising a pair of hard rubber plates, separated by sealing material, both of said plates being sealed in said vessel, connections between said rods at points on said cover, shoulders on said rods supporting the lower plate, and reinforcing rods between said cover plates extending at a plane at right angles to said terminal rods.

4. In a storage battery, a series of electrode plates each having upwardly extending rods secured thereto, a containing vessel for said plates, a cover therefor, said rods passing through said cover, said cover comprising a pair of hard rubber plates separated by sealing material, and a pair of bus-bars mounted on top of said cover and secured to the upper end of said rods, whereby all connections between said plates are made through said bus-bars.

5. In a storage battery, a plurality of cells, each cell comprising a series of positive and negative electrode plates arranged alternately, each of the positive plates having an upwardly extending rod secured thereto at one end thereof, and each of the negative plates having an upwardly extending rod secured thereto at the other end thereof, a containing vessel for said cells, a cover therefor, said rods passing through said cover, a bus-bar on top of said cover secured to the rods extending from the positive plates, a second bus-bar connected to the rods extending from the negative plates, each of said bus-bars being provided with a portion insulated from the remainder of said bus-bar, and connecting leads integrally connected to the insulated portions of said bus-bars.

Signed by me at Chicago, Illinois, this 28th day of July, 1914.

WILLIAM GARDINER.

Witnesses:
 E. H. CLEGG,
 G. H. TRENTON.